United States Patent [19]

Inoue et al.

[11] Patent Number: 5,685,598
[45] Date of Patent: Nov. 11, 1997

[54] MOUNT STRUCTURE FOR AN INSTRUMENT PANEL

[75] Inventors: Toshihiro Inoue; Jun Katakabe, both of Wako, Japan

[73] Assignee: Honda Giken Kogyo Kabushiki Kaisha, Tokyo, Japan

[21] Appl. No.: 514,506

[22] Filed: Aug. 11, 1995

[30] Foreign Application Priority Data

Aug. 18, 1994 [JP] Japan .................. 6-194352

[51] Int. Cl.$^6$ ...................................... B60K 37/00
[52] U.S. Cl. .................. 296/194; 296/70; 180/90
[58] Field of Search ............ 296/194, 70, 192, 296/208, 72; 180/90

[56] References Cited

U.S. PATENT DOCUMENTS

| | | | |
|---|---|---|---|
| 4,474,391 | 10/1984 | Masuno et al. | 296/70 X |
| 4,733,739 | 3/1988 | Lorenz et al. | 296/72 X |
| 4,909,566 | 3/1990 | Hashimoto et al. | 296/70 X |
| 5,005,898 | 4/1991 | Benedetto et al. | 296/70 X |
| 5,120,106 | 6/1992 | Sakurai et al. | 296/70 X |
| 5,358,300 | 10/1994 | Gray | 296/194 X |
| 5,387,023 | 2/1995 | Deneau | 296/72 |

FOREIGN PATENT DOCUMENTS

| | | | |
|---|---|---|---|
| 4134436 | 4/1992 | Germany | 296/72 |
| 58-82937 | 6/1983 | Japan . | |

*Primary Examiner*—Joseph D. Pape
*Attorney, Agent, or Firm*—Armstrong, Westerman, Hattori, McLeland & Naughton

[57] ABSTRACT

A mount structure for an automobile body has a recess portion defined in a defroster duct and a projection defined in a cowl box. Both the recess portion and the projection have sloping surfaces, wherein the sloping angles of the surfaces are predetermined for enabling the direction of removal of an instrument panel from the automobile body to be freely selected from within a given angular range. Accordingly, the panel unit, which can include various components formed integrally therewith, can be easily and precisely positioned in the automobile body. Further, removal of the panel unit for routine maintenance can be easily performed without obstruction from other automotive components which remain in place in the automobile body.

9 Claims, 6 Drawing Sheets

MOUNT STRUCTURE FOR AN INSTRUMENT PANEL

BACKGROUND OF THE INVENTION

1. Field of the Invention

The present invention relates to a mount structure for detachably mounting an instrument panel in an automobile body.

2. Description of the Related Art

It has generally been customary to install various automobile components, including air-conditioners, ABS (Antilock Braking System), engine control ECU (Electronic Control Unit), EAT (Electronic Automatic Transmission), pillar pipes, ducts, and an instrument panel, successively into the passenger's compartment side of an automobile body. Therefore, numerous stages have been required to assemble these components into the automobile body. Hence, assembly of these components into the automobile body has traditionally been extremely complex and time consuming.

By contrast, if a panel unit composed of the above components is assembled integrally beforehand, and then installed in an automobile body, the number of steps needed to install the components is greatly reduced, and the process of installing the components in the automobile body is simplified and made more efficient.

When a panel unit is installed in an automobile body, it is first required to position the panel unit at a corresponding position in the automobile body. For example, as disclosed in Japanese Laid-Open Utility Model Publication No. 58-82937, a positioning structure for an instrument panel is known which entails engaging a pin fixed to the instrument panel with a rubber bush attached to a cowl box. Alternatively, the positioning structure for the instrument panel may entail engaging a pin fixed to a boss of the instrument panel with an elastic clip attached to an automobile body side.

In each of the above conventional arrangements, however, the direction in which the instrument panel can be removed corresponds to the axis of the pin which is fixed to the instrument panel. Therefore, if the above conventional arrangements are adopted as a positioning structure for the panel unit, it becomes necessary to point the axis of the pin in a substantially horizontal direction in order to enable easy attachment of the panel unit.

However, with the above arrangement, the panel unit can be attached and detached from the automobile body only in the horizontal direction (i.e. the axial direction of the pin). Thus, when a maintenance operation is required in which only the instrument panel is desired to be detached from the automobile body, the instrument panel becomes obstructed by the other components. Consequently, not only the instrument panel, but the other components as well must be detached from the automobile body, thus complicating the whole maintenance operation.

SUMMARY OF THE INVENTION

It is an object of the present invention to provide a mount structure for an instrument panel, which enables positioning of a panel unit installed integrally with various components in an automobile body easily and precisely.

Another object of the present invention is to provide a mount structure for an instrument panel, which allows only desired components to be easily removed from the automobile body.

The above and other objects, features and advantages of the present invention will become apparent from the following description, in which preferred embodiments of the present invention are illustrated by way of example.

DETAILED DESCRIPTION OF THE PREFERRED EMBODIMENTS

Figure 1:
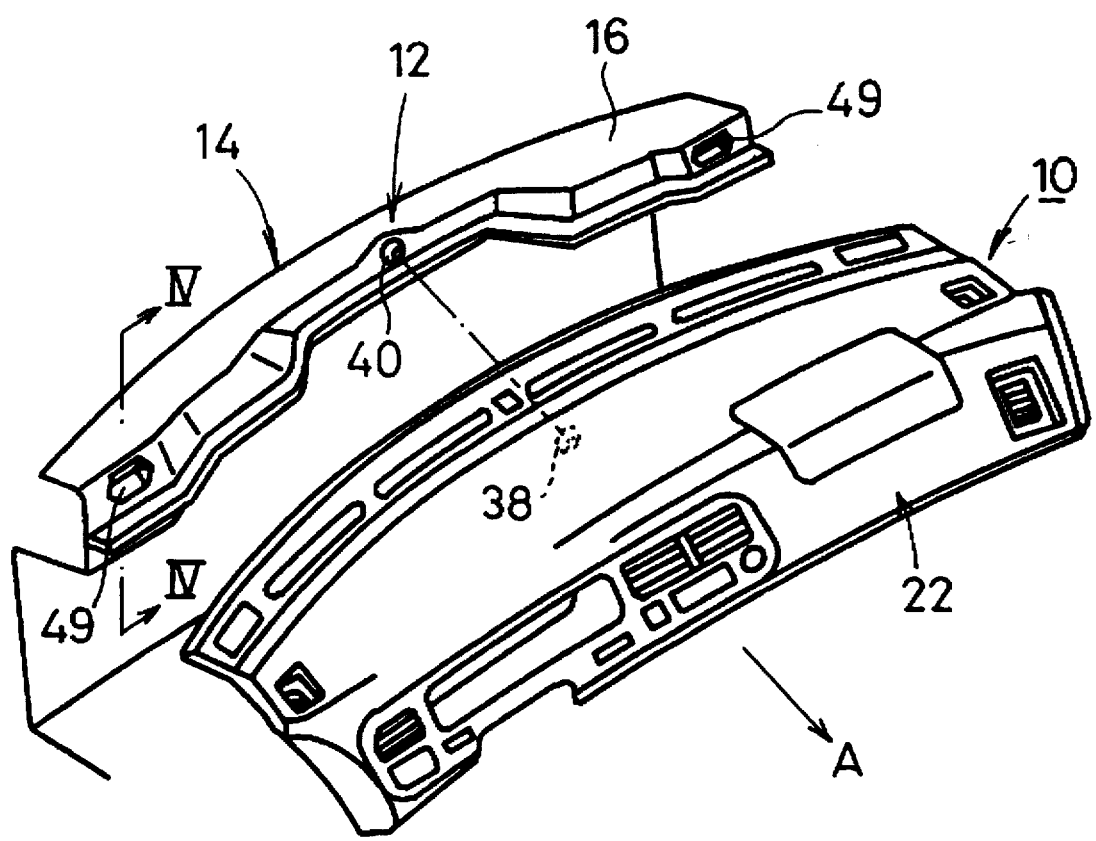
FIG. 1 is a perspective view of a panel unit and an automobile body, employing a mount structure for the instrument panel according to one embodiment of the present invention.
Figure 2:
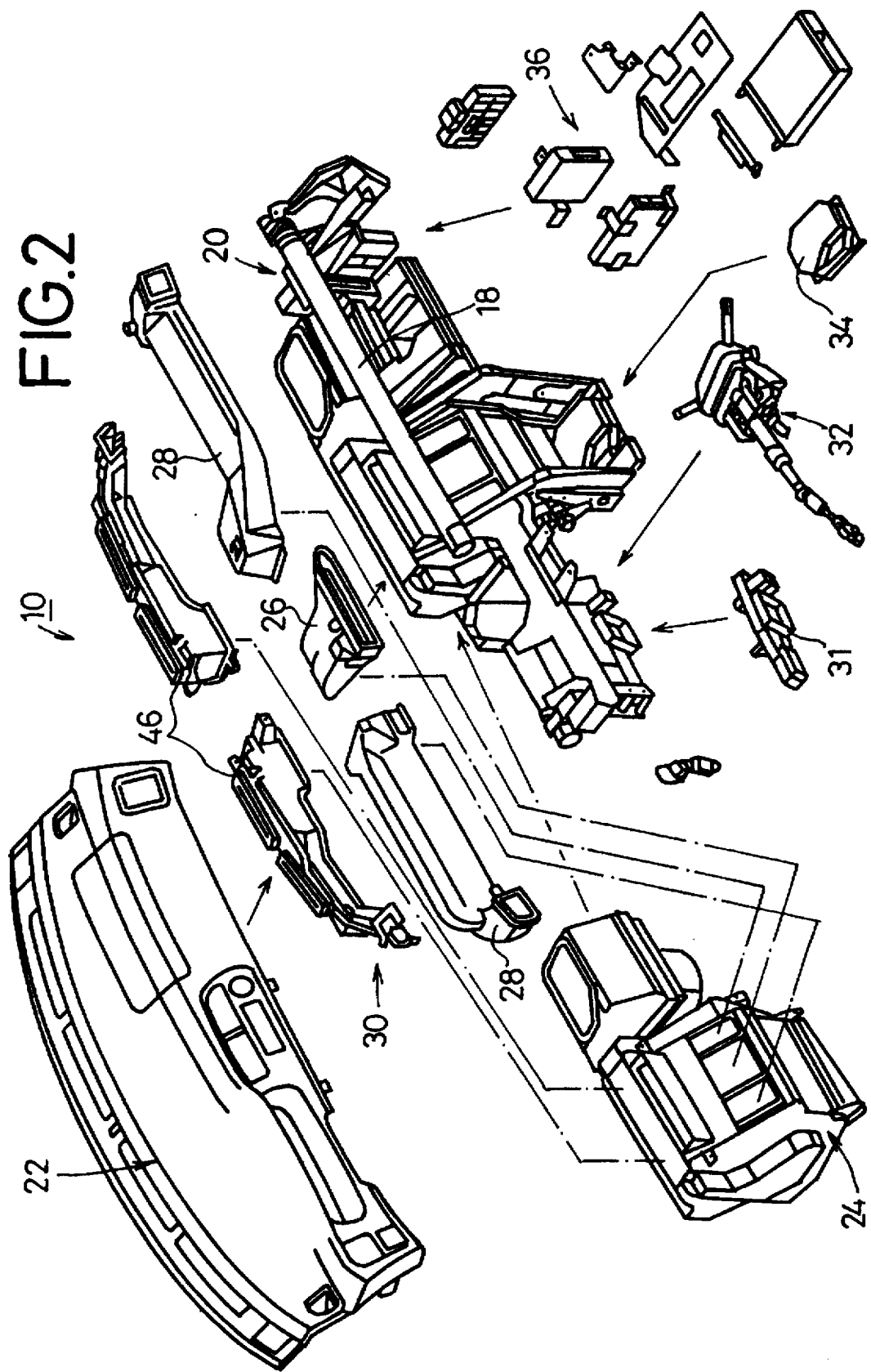
FIG. 2 is an exploded perspective view of the panel unit.

As shown in FIGS. 1 and 2, a panel unit, generally denoted by the reference number 10, is installed using a mount structure according to one embodiment of the present invention. As shown, the panel unit has been fixed to a cowl box corresponding to a passenger's compartment side of an automobile, using a mount structure 12 according to the first embodiment of the present invention.

As shown in FIG. 2, the panel unit 10 has a support member 20 which is composed integrally of a pillar pipe 18 and a wire harness (not shown). The support member has integrally fixed therewith an instrument panel 22, an air-conditioning unit 24, a center duct 26, a duct unit 30 composed of at least a pair of side ducts 28 and a defroster duct 46, a box 31, a steering unit, an air bag inflator module 34, and a control unit 36 provided with an engine control ECU, an ABS, and EAT and a TCS (Transmission Controlled Spark), etc.

Figure 3:
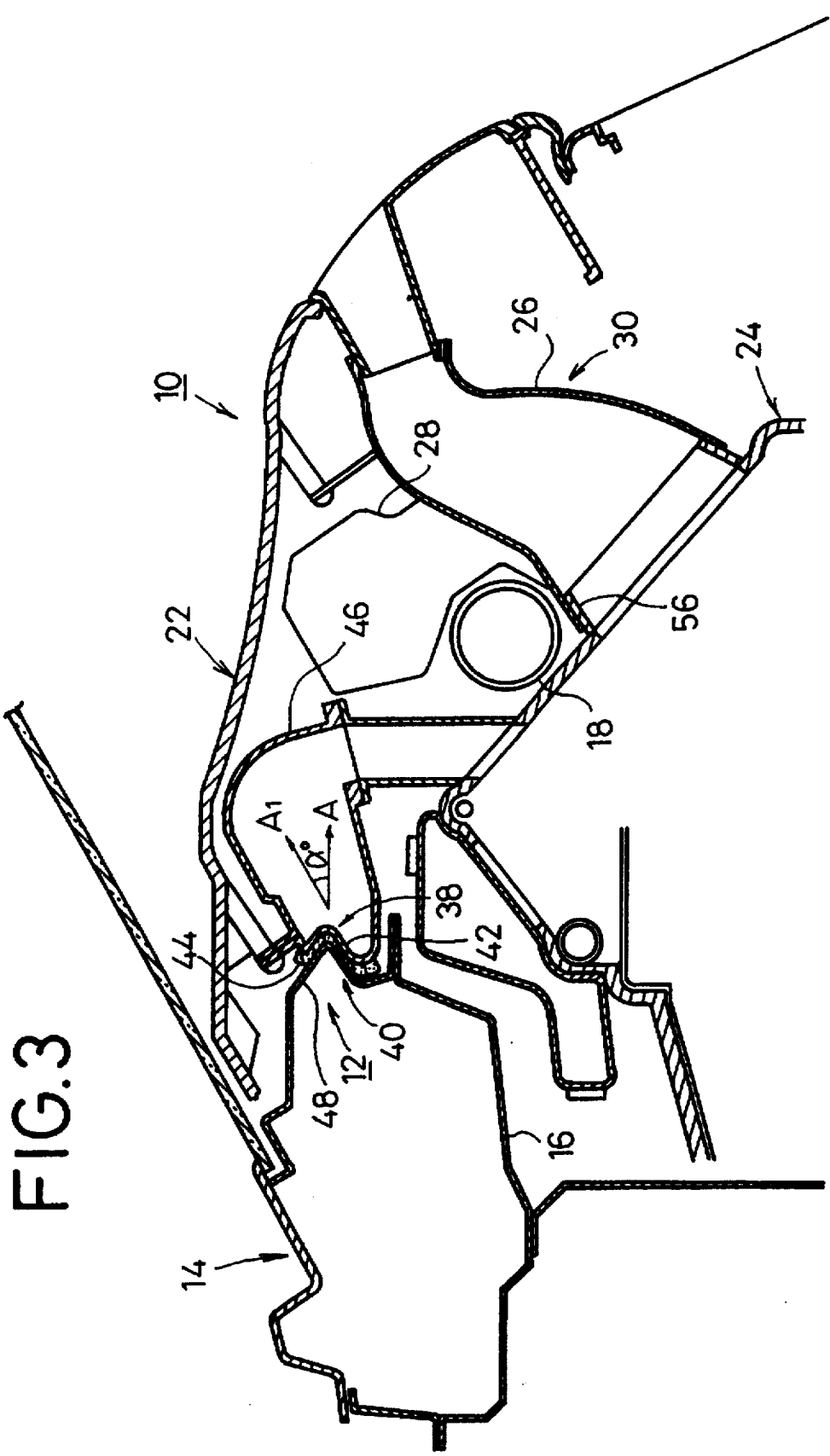
FIG. 3 is a vertical cross-sectional view of a part of the mount structure according to the first embodiment of the present invention.

As shown in FIGS. 1 and 3, the mount structure 12 has a recess portion (fitting portion) 38 defined in the panel unit 10, and a projection (fitting portion) 40 defined in the automobile body 14. The recess portion 38 is defined in an end portion of the defroster duct 46 which faces the cowl box 16, and is also positioned substantially at the longitudinal center of the instrument panel 22. The recess portion 38 has a sloping surface 42 having an inwardly tapered shape (see FIG. 3). The sloping surface 42 has a cushion member 44 formed of sponge rubber. The projection 40 is defined in the cowl box 16, and also has a sloping surface 48 which projects toward the panel unit 10.

As shown in FIG. 3, the sloping surfaces 42, 48 provide for proper positioning of the panel unit 10, and are attached to each other when the recess portion 38 engages with the projection 40. The respective angles of the sloping surfaces 42, 48 are determined for enabling the removal direction of the panel unit 10 to be easily selected. More specifically, the removal direction of the instrument panel 22 from the automobile body 14 can occur within a certain angular range $\alpha°$.

Figure 4:
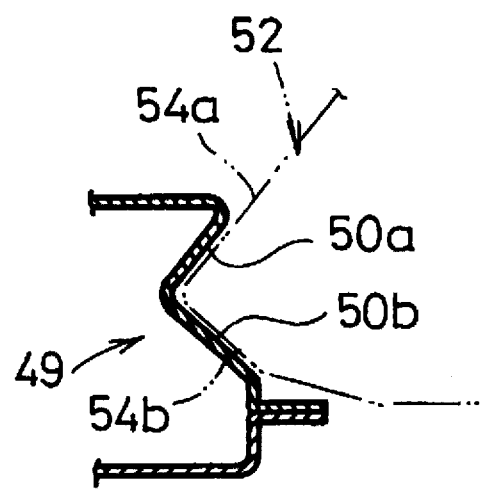
FIG. 4 is a cross-sectional view taken along line IV—IV of FIG. 1.

As shown in FIG. 1, both ends of the cowl box 16 have respective recesses 49 defined thereon. An inner surface of each recess 49 is defined by two sloping surfaces 50a, 50b having a given vertical angle between them (see FIG. 4). Both longitudinal ends of the instrument panel 22 include a pair of projections 52, which are able to attach with the respective recesses 49. Each projection 52 has sloping surfaces 54a, 54b defined thereon corresponding to the sloping surfaces 50a, 50b.

As shown in FIG. 3, the components of the duct unit 30, which include the side duct 28, the center duct 26 and the defroster duct 46, are fixed to a projection 56 defined in the air-conditioner unit 24, for example, by press-fitting them against the projections 56.

The instrument panel 22, air-conditioner unit 24, duct unit 30, box 31, steering unit 32, air bag inflator module 34 and the control unit 36, etc., are integrally installed on the support member 20 in the mount structure 12 prior to installation of the panel unit 10.

The components of the duct unit 30, including the side duct 28 and the center duct 26, are pressed against and inserted into the projection 56. Therefore, the air-conditioner unit 24 and the duct unit 30 can be accurately and air-tightly fixed in place. Further, various components can be mounted by the support member 20, so the shape of the instrument panel 22 is simplified.

The panel unit 10 is mounted to the automobile body 14. Specifically, when the panel unit 10 is moved in the direction opposite to the direction A, the recess portion 38 defined in the duct unit 30 and the projection 40 defined in the cowl box 16 engage with each other. The projection 52 of the panel unit 10 engages with the recess 49 defined in the cowl box 16. Therefore, the panel unit 10 is accurately positioned in the automobile body 14. The panel unit 10 can also be more securely attached to the automobile body 14 using a bolt, for example (not shown).

According to this embodiment, the components of the mount structure 12, in particular the sloping surface 42 of the recess portion 38 and the sloping surface 48 of the projection 40, are attached to each other, wherein such sloping surfaces 42, 48 are of a tapered conical shape. Therefore, when the projection 40 engages the recess portion 38, the center position of the panel unit 10 is accurately positioned. Further, when the pair of projections 52 defined in the respective ends of the panel unit 10 engage with the recesses 49 defined in both end sides of the cowl box 16, the height of the right and left sides of the panel unit 10 can be precisely arranged. Consequently, the panel unit 10 can be precisely mounted to the automobile body 14, while accurately fixing each of the upper, lower, right and left sides of the panel unit.

Importantly, when a maintenance operation is performed, it is often necessary to detach only the instrument panel 22, or alternatively the instrument panel 22 integrally with the duct unit 30, from the automobile body 14. In such cases, according to the present embodiment, as shown in FIG. 3, because of the sloping surfaces 42, 48, the direction of removal of the panel unit 10 from the automobile body (i.e. the direction A) can be freely selected from within the angular range $\alpha°$.

Therefore, the instrument panel 22 can be easily detached from the automobile body 14 in a diagonal upward direction, as indicated by the arrow $A_1$ in FIG. 3. Further, the duct unit 30 together with the integral instrument panel can be detached from the automobile body free from any obstruction with other components which should remain in the automobile body 14. Consequently, by advantageously selecting the removal direction of the instrument panel 22 from the automobile body 14 to be within the angular range $\alpha°$, the detaching operation of the instrument panel 22 from the automobile body is made easy and efficient, and maintenance operations can be simplified.

According to this embodiment, the recess portion 38 is defined directly in the defroster duct 46, and the projection 40 is defined directly in the cowl box 16. Therefore, measurement precision and tolerances can be improved, and the number of required assembly components can be effectively reduced.

Figure 5:
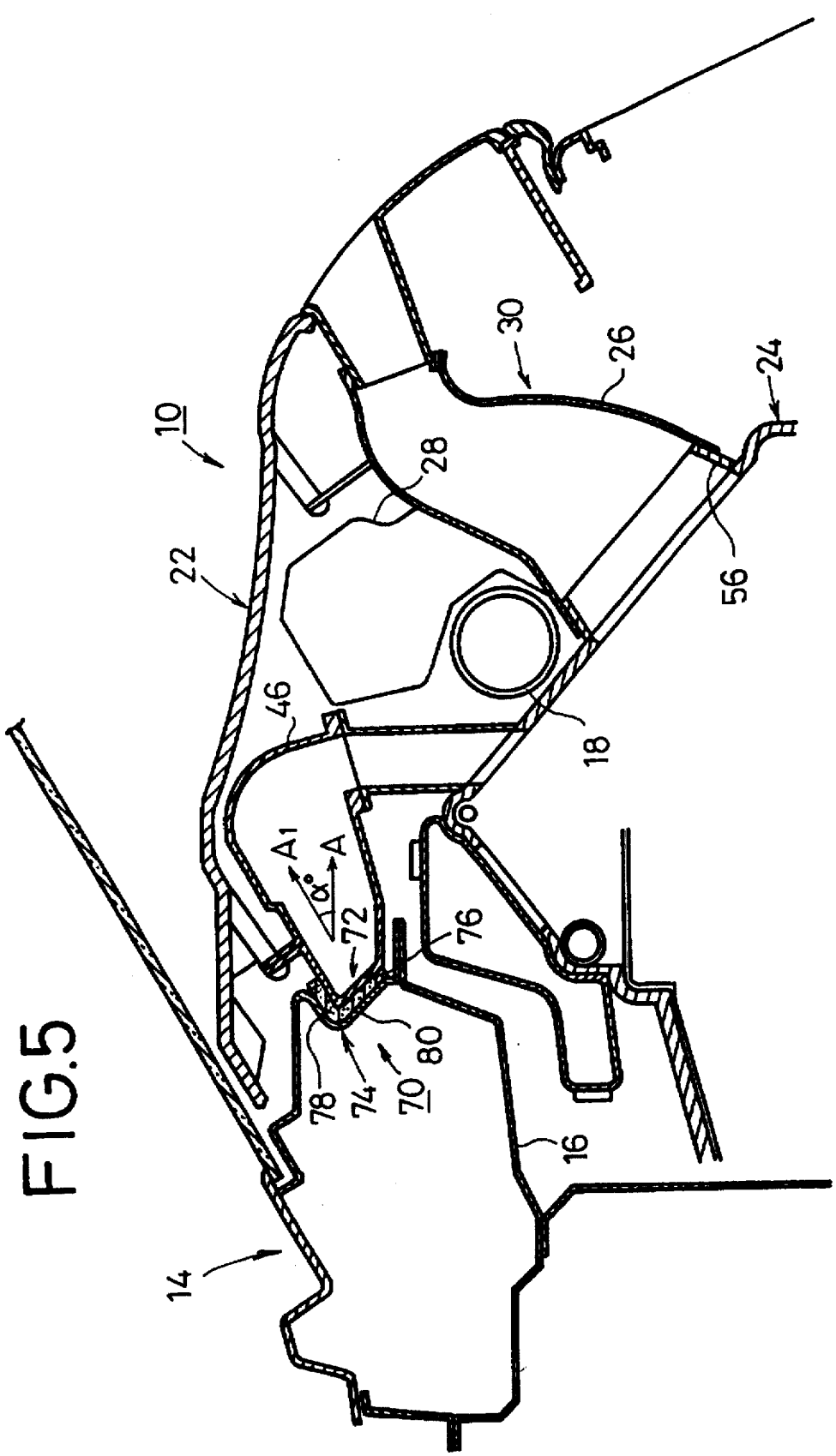
FIG. 5 is a vertical cross-sectional view of a part of the mount structure according to a second embodiment of the present invention.

FIG. 5 shows another mount structure 70 according to a second embodiment of the present invention. The same structural elements as those employed in the first embodiment are identified by like reference numerals, and hence their detailed description has been omitted.

In the mount structure 70, in a manner opposite to that of the mount structure 12, a projection (fitting portion) 72 is defined in the defroster duct 46, and a recess portion (fitting portion) 74 is defined in the cowl box 16. The projection 72 has a sloping surface 76 which projects toward the cowl box 16, and the sloping surface 76 further has a cushion member 78 of sponge rubber formed thereon. The recess portion 74 similarly has a sloping surface 80, but having an inwardly tapered shape.

According to the second embodiment, the direction of removal of the instrument panel 22 from the automobile body (i.e. the direction A) can be freely selected from within a given angular range $\alpha°$. Accordingly, the second embodiment offers similar advantages to those of the first embodiment.

Figure 6:
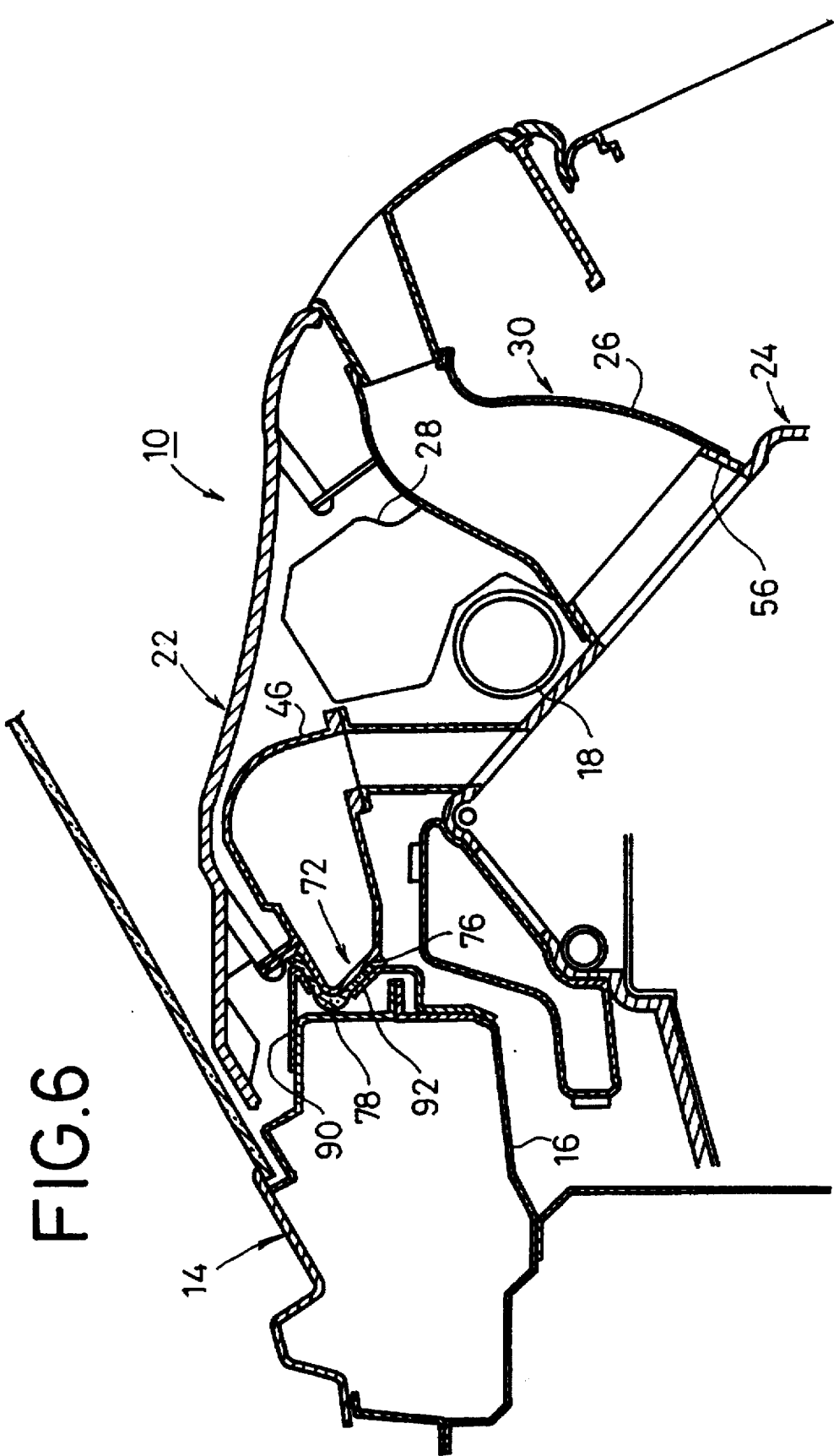
FIG. 6 is a vertical cross-sectional view of a part of another mount structure according to the second embodiment of the present invention.

FIG. 6 shows another cowl box 16 which includes an additional guide member 90 instead of having a recess portion formed directly on the cowl box 16. The guide member 90 includes a recess portion 92 which corresponds in function to the recess portion 74 described in the second embodiment.

What is claimed is:

1. A mount structure for an instrument panel comprising:
   an automobile body;
   a panel unit having components thereon, said components comprising at least an instrument panel, a duct, and an air-conditioner fixed to said panel unit, said panel unit being detachably fixable to and removable from said automobile body;
   said panel unit and said automobile body having at least one fitted portion including a recess portion and a projection defined respectively thereon, for positioning said panel unit on said automobile body when said recess portion and said projection engage each other; and
   each said recess portion and said projection having a sloping surface for selection of a removal direction for removal of said panel unit from said automobile body within a predetermined angular range.

2. A mount structure according to claim 1, wherein said recess portion is defined on said duct, and said projection is defined on said automobile body.

3. A mount structure according to claim 2, wherein said recess portion and said projection each comprises a projection having a conically shaped sloping surface.

4. A mount structure according to claim 3, further comprising a cushion member fixed to said sloping surface of said recess portion.

5. A mount structure according to claim 1, wherein said projection is defined on said duct, and said recess portion is defined on said automobile body.

6. A mount structure according to claim 5, wherein said recess portion and said projection each comprises a projection having a conically shaped sloping surface.

7. A mount structure according to claim 6, further comprising a cushion member fixed to said sloping surface of said recess portion.

8. A mount structure according to claim 1, wherein a pair of fitting portions are positioned substantially at a longitudinal center of said panel unit and said automobile body, and further pairs of fitting portions are positioned at respective longitudinal end sides of said panel unit and said automobile body.

9. A mount structure according to claim 1, wherein at least some of the components defined in said panel unit are secured by press-fitting said components to said panel unit.

* * * * *